United States Patent
Yang

(10) Patent No.: US 10,091,782 B2
(45) Date of Patent: Oct. 2, 2018

(54) DATA COMMUNICATION METHOD, STATION, AND SYSTEM

(71) Applicant: HUAWEI TECHNOLOGIES CO., LTD., Shenzhen (CN)

(72) Inventor: Xun Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 114 days.

(21) Appl. No.: 15/238,430

(22) Filed: Aug. 16, 2016

(65) Prior Publication Data

US 2016/0360522 A1 Dec. 8, 2016

Related U.S. Application Data

(63) Continuation of application No. PCT/CN2014/073066, filed on Mar. 7, 2014.

(51) Int. Cl.
*H04L 1/00* (2006.01)
*H04W 72/04* (2009.01)
(Continued)

(52) U.S. Cl.
CPC ....... *H04W 72/0426* (2013.01); *H04W 48/00* (2013.01); *H04W 48/08* (2013.01);
(Continued)

(58) Field of Classification Search
CPC .......................... H04B 7/2121; H04B 7/2123; H04B 7/18528; H04B 7/18571; H04B 7/18576;
(Continued)

(56) References Cited

U.S. PATENT DOCUMENTS

| 8,594,007 B2 | 11/2013 | Wentink |
| 2011/0261742 A1 | 10/2011 | Wentink |

(Continued)

FOREIGN PATENT DOCUMENTS

| CN | 102595517 A | 7/2012 |
| CN | 102859924 A | 1/2013 |
| CN | 103052077 A | 4/2013 |
| WO | 2013077653 A1 | 5/2013 |

OTHER PUBLICATIONS

International Search Report and Written Opinion of the International Search Authority (including English translation) issued in corresponding International Application No. PCT/CN2014/073066, dated Dec. 17, 2014, 20 pages.

(Continued)

*Primary Examiner* — Dady Chery
(74) *Attorney, Agent, or Firm* — Leydig, Voit & Mayer, Ltd.

(57) ABSTRACT

A data communication method and system are provided. In the method, a station sends sequence numbers to at least two APs, where the sequence numbers indicate a sequence in which the APs respond to the station. The station broadcasts a wake-up message to the at least two APs. The station receives acknowledgement messages sequentially returned by the at least two APs according to the sequence numbers of the APs. The station determines according to the sequentially returned acknowledgement messages, whether the corresponding APs need to transmit the downlink data. The station sequentially completes, according to the sequence numbers, downlink data transmission with the APs.

7 Claims, 8 Drawing Sheets

(51) Int. Cl.
*H04W 48/00* (2009.01)
*H04W 52/02* (2009.01)
*H04W 48/08* (2009.01)
*H04W 88/08* (2009.01)

(52) U.S. Cl.
CPC ..... *H04W 52/0216* (2013.01); *H04W 72/042* (2013.01); *H04W 88/08* (2013.01); *Y02D 70/00* (2018.01); *Y02D 70/142* (2018.01)

(58) Field of Classification Search
CPC .. H04B 7/2615; H04J 2203/0069; H04J 4/00; H04Q 2213/394; H04W 72/04; H04W 72/12; H04W 76/00; H04W 84/06; H04L 5/26; H04L 1/0002
USPC ....... 370/329, 330, 332, 333, 337, 338, 341, 370/343, 344, 347, 348
See application file for complete search history.

(56) References Cited

U.S. PATENT DOCUMENTS

| | | |
|---|---|---|
| 2013/0201974 A1 | 8/2013 | Merlin et al. |
| 2013/0294427 A1* | 11/2013 | Kim ...................... H04W 16/14 370/338 |
| 2014/0204821 A1 | 7/2014 | Seok et al. |
| 2014/0328237 A1* | 11/2014 | Sammour ............. H04L 1/1614 370/311 |
| 2014/0341100 A1* | 11/2014 | Sun ................... H04W 52/0238 370/311 |

OTHER PUBLICATIONS

Extended European Search Report issued in corresponding EP Application No. 14885025, dated Jan. 16, 2017, 6 pages.

* cited by examiner

DATA COMMUNICATION METHOD, STATION, AND SYSTEM

CROSS-REFERENCE TO RELATED APPLICATIONS

This application is a continuation of International Application No. PCT/CN2014/073066, filed on Mar. 7, 2014, which is hereby incorporated by reference in its entirety.

TECHNICAL FIELD

The present disclosure relates to the field of communications technologies, and in particular, to a data communication method, a station, and a system.

BACKGROUND

With rapid development of wireless communications technologies, increasingly more wireless devices such as an access point (AP) and a station (STA) are deployed. In a densely deployed wireless local area network, because of a need of continuous network deployment, a signal overlapping area may exist between adjacent basic service sets (BSS). Because spectrum resources are limited, these adjacent BSSs may work on a same channel, thereby causing the adjacent BSSs to form an overlapped basic service set (OBSS).

SUMMARY

Embodiments of the present disclosure provide a data communication method, a station and a system.

A first aspect of the embodiments of the present disclosure provides a data communication method. In the method, a station sends sequence numbers to at least two access points, where the sequence numbers indicate a sequence in which the access points respond to the station. The station broadcasts a wake-up message to the at least two access points, where the wake-up message notifies the at least two access points that the station is in a wake-up state. The station receives acknowledgement messages sequentially returned by the at least two access points according to the sequence numbers of the access points, where the acknowledgement messages indicate whether the access points need to transmit downlink data. The station determines, according to the sequentially returned acknowledgement messages, whether the corresponding access points need to transmit the downlink data. The station sequentially completes according to the sequence numbers, downlink data transmission with the access points that need to transmit the downlink data.

A second aspect of the embodiments of the present disclosure provides a station. The station may include: a sending unit, a broadcast unit, a receiving unit, a transmission unit, and. The sending unit is configured to send sequence numbers to at least two access points, where the sequence numbers indicate a sequence in which the access points respond to the station. The broadcast unit is configured to broadcast a wake-up message to the at least two access points, where the wake-up message notifies the at least two access points that the station is in a wake-up state. The receiving unit is configured to receive acknowledgement messages sequentially returned by the at least two access points according to the sequence numbers of the access points, where the acknowledgement messages indicate whether the access points need to transmit downlink data. The transmission unit is configured to determine, according to the sequentially returned acknowledgement messages, whether the corresponding access points need to transmit the downlink data. The a transmission unit is further configured to sequentially complete, according to the sequence numbers, downlink data transmission with the access points that need to transmit the downlink data.

A third aspect of the embodiments of the present disclosure provides a system. The system may include: the station according to the second aspect or any implementation manner of the second aspect of the embodiments of the present disclosure. The system may further include a first access point and a second access point. The first access point is configured to receive a sequence number allocated by the station; when receiving a wake-up message of the station, return a first acknowledgement message according to the sequence number allocated by the station; and when needing to transmit downlink data, complete downlink data transmission with the station according to the sequence number. The second access point is configured to receive a sequence number allocated by the station, where a sequence corresponding to the sequence number of the first access point is higher than a sequence corresponding to the sequence number of the second access point; when receiving the wake-up message of the station, return a second acknowledgement message according to the sequence number allocated by the station; and after the station completes downlink data transmission with the first access point, the second access point completes downlink data transmission with the station according to the sequence number.

It should be understood that both the foregoing general description and the following detailed description are exemplary and explanatory only and are not restrictive of the disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
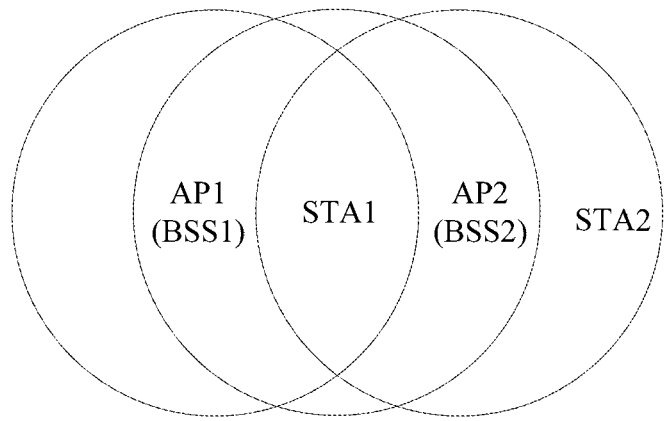
FIG. 1 is a schematic scenario diagram of an OBSS system.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Implementation of the embodiments of the present disclosure brings the following beneficial effects: A station allocates sequence numbers to access points within a working area, so as to avoid communication interference and a time conflict when the access points return messages or data, thereby reducing system power consumption, ensuring normal communication, implementing that when being woken up once in different BSSs, the station can obtain information returned by multiple access points, reducing a quantity of station wake-ups, and reducing energy consumption of the station.

Embodiments of the present disclosure provide a data communication method, a station, and a system, so as to resolve a problem in an OBSS system that a station cannot obtain information returned by multiple access points in one wake-up and energy consumption of the station is relatively large.

In a first possible implementation manner of the first aspect, when the at least two access points include a first access point and a second access point, and a sequence corresponding to a sequence number of the first access point is higher than a sequence corresponding to a sequence number of the second access point, the sequentially completing, by the station according to the sequence numbers, downlink data transmission with the access points that need to transmit the downlink data includes: sending, by the station, a first transmission trigger message to the first access point, so that the first access point returns first downlink data; broadcasting, by the station, a first transmission acknowledgement message; sending, by the station, a second transmission trigger message to the second access point, so that the second access point returns second downlink data; and broadcasting, by the station, a second transmission acknowledgement message.

With reference to the first possible implementation manner of the first aspect, in a second possible implementation manner, when the first access point further needs to transmit third downlink data to the station after transmitting the first downlink data, when the first access point returns the first downlink data, the station receives an indication message that is sent by the first access point and indicates that more data needs to be transmitted; and after the station broadcasts the second transmission acknowledgement message, the station sends a third transmission trigger message to the first access point, so that the first access point returns the third downlink data.

In a first possible implementation manner of the second aspect, when the at least two access points include a first access point and a second access point, and a sequence corresponding to a sequence number of the first access point is higher than a sequence corresponding to a sequence number of the second access point, the sending unit is further configured to send a first transmission trigger message to the first access point, so that the first access point returns first downlink data; the broadcast unit is further configured to broadcast a first transmission acknowledgement message; the sending unit is further configured to send a second transmission trigger message to the second access point after the broadcast unit broadcasts the first transmission acknowledgement message, so that the second access point returns second downlink data; and the broadcast unit is further configured to broadcast a second transmission acknowledgement message.

With reference to the first possible implementation manner of the second aspect, in a second possible implementation manner, when the first access point further needs to transmit third downlink data to the station after transmitting the first downlink data, when the first access point returns the first downlink data, the receiving unit is further configured to receive an indication message that is sent by the first access point and indicates that more data needs to be transmitted; and after the broadcast unit broadcasts the second transmission acknowledgement message, the sending unit is further configured to send a third transmission trigger message to the first access point, so that the first access point returns the third downlink data.

As shown in FIG. 1, a STA in an overlapping area of adjacent BSSs is affected by multiple BSSs in a perception range during communication. Compared with a STA in a non-overlapping area, a probability that the STA in the overlapping area obtains a channel by means of contention is relatively low, thereby causing a relatively low throughput of the STA in the overlapping area, and even causing a possible failure of information exchange during communication with an AP.

For a feature that a STA in an overlapping area in an OBSS system can simultaneously receive signals from multiple APs, the STA is allowed to perform management on and communication with more than one AP. For example, an alternate wake-up may be performed by associating the STA with multiple APs and setting different sleep time in different BSSs, thereby implementing time-division communication with different APs. However, in the OBSS system, when a STA1 in the overlapping area is woken up in a BSS1, the STA1 can only obtain information sent by an AP1, and when the STA1 is woken up in a BSS2, the STA1 can only obtain information sent by an AP2. Consequently, the STA1 cannot obtain information returned by multiple APs in one wake-up. Moreover, this time-division wake-up manner increases a frequency of waking up the STA1, thereby increasing energy consumption of the STA1.

Figure 2:
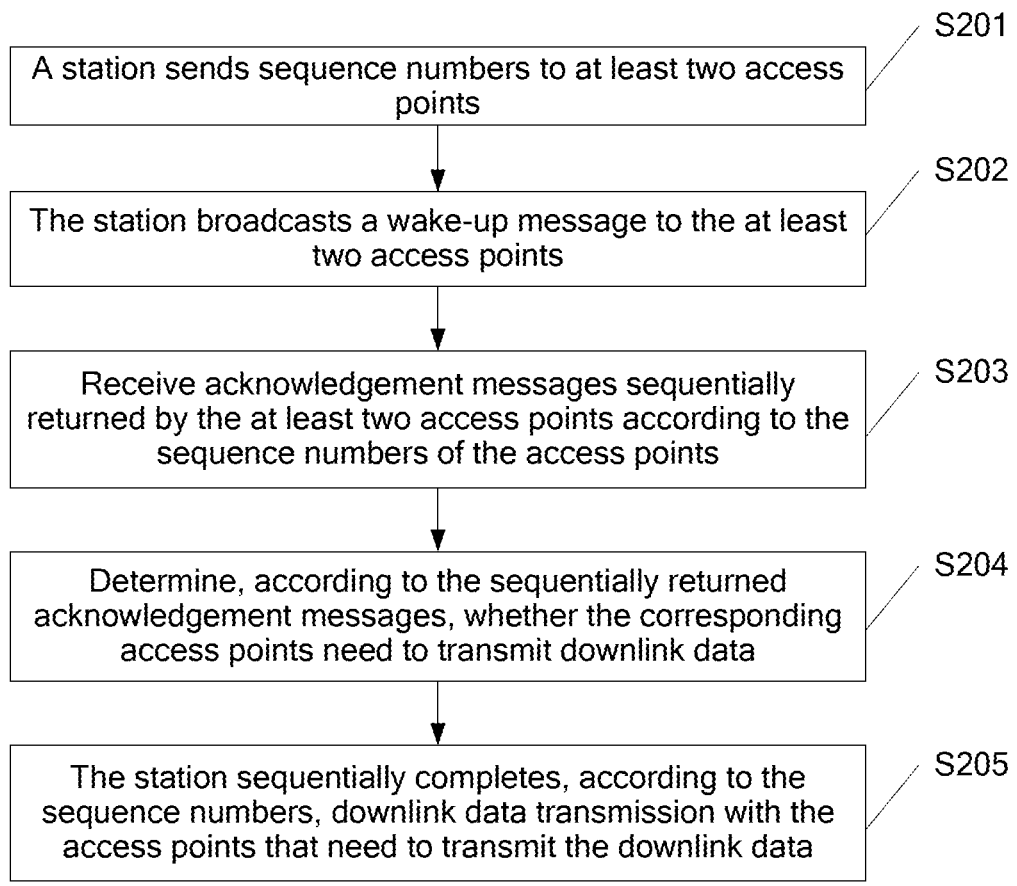
FIG. 2 is a schematic flowchart of a first embodiment of a data communication method according to the present disclosure.

Referring to FIG. 2, FIG. 2 is a schematic flowchart of a first embodiment of a data communication method according to the present disclosure. In this embodiment, the method includes the following steps:

S201. A station sends sequence numbers to at least two access points.

The sequence numbers indicate a sequence in which the access points respond to the station. The at least two access points are all within a communication range of the station.

For example, in an OBSS system, there are at least a first access point and a second access point in a working area of a station, that is, a communication range. When the station does not pre-allocate sequence numbers to the access points when broadcasting a message, two or even more access points may return response messages at the same time, thereby causing an information conflict and finally a communication failure. Therefore, the station may pre-allocate sequence numbers to the access points and send the sequence numbers to the access points. Generally, the first access point may be used as an initial access point and be allocated with a sequence number 1 in the first place. Other access points may be sequentially allocated with sequence numbers with reference to a distance, interference, or another factor, or may be randomly allocated with sequence numbers.

S202. The station broadcasts a wake-up message to the at least two access points.

The wake-up message is configured to notify the at least two access points that the station is in a wake-up state. For example, when the station changes to the wake-up state from a sleep state, the station may send one PS-Poll frame, so as to obtain any previously cached frame from the access points. In addition, the station in the wake-up state may add an association ID (AID) into the PS-Poll frame, so as to indicate a BSS to which the station in the wake-up state belongs. Certainly, in this embodiment, the wake-up message may be the PS-Poll frame, or may be another frame or message, provided it is ensured that the access points in the working area of the station may be notified that the station is woken up and needs the access points to return acknowledgement messages.

Optionally, to avoid unwanted power consumption and communication interference that may be generated in the OBSS system, when broadcasting the wake-up message to the access points, the station may instruct other stations within the communication range of the station to respectively set network allocation vectors (NAV) of the other stations, so that the other stations in the area may learn that the station is preparing to perform data transmission with the access points. Therefore, the other stations in the area may configure corresponding silent time by using the NAVs, and remain silent within a time period, thereby avoiding an increase of the unwanted power consumption and reducing interference to the station.

S203. Receive acknowledgement messages sequentially returned by the at least two access points according to the sequence numbers of the access points.

The acknowledgement messages are configured to indicate whether the access points need to transmit downlink data.

Optionally, the acknowledgement messages may be acknowledgement characters (ACK), or certainly, may be other messages or characters, provided it is ensured that whether the access points need to transmit downlink data may be indicated.

Because the sequence numbers are pre-allocated to the access points, when the station broadcasts the wake-up message, the access points may sequentially return the acknowledgement messages according to the sequence numbers of the access points. Therefore, a situation in which multiple access points return acknowledgement messages at the same time, thereby causing a message conflict, and receiving of the station is faulty or even fails does not occur.

S204. Determine, according to the sequentially returned acknowledgement messages, whether the corresponding access points need to transmit downlink data.

Because the acknowledgment messages may indicate whether the access points need to transmit the downlink data, the station may determine, according to the received acknowledgement messages, whether the access points need to transmit the downlink data. For example, first, second, and third acknowledgement messages that are sequentially returned by three access points are received currently, and the three acknowledgement messages correspondingly indicate data transmission requirements of first, second, and third access points respectively. When the first and the third acknowledgement messages indicate that downlink data needs to be transmitted, and the second acknowledgement message indicates that no downlink data needs to be transmitted, the station only needs to complete downlink data transmission with the first access point and the third access point when subsequently performing data transmission.

S205. The station sequentially completes, according to the sequence numbers, downlink data transmission with the access points that need to transmit the downlink data.

Optionally, when acknowledgement messages returned by multiple access points within the communication range of the station all indicate that downlink data needs to be transmitted, the station may sequentially complete downlink data transmission with the access points according to a sequence indicated by the sequence numbers. Certainly, reverse transmission in sequence or even random transmission may also be performed, provided it is ensured that the station returns a corresponding transmission completion message after transmission is completed each time and then performs next transmission, and it is ensured that a situation in which multiple access points return downlink data at the same time does not occur.

Optionally, when the station sends a message or data to an access point within the communication range of the station, the station may instruct other stations within the communication range of the station to respectively set network allocation vectors of the other stations; when a corresponding access point within the communication range of the station sends a message or data to the station, another station within a communication range of the access point may also configure a network allocation vector of the another station, where the network allocation vector is configured to configure silent time of a device.

Configuring a corresponding NAV in a communication process may ensure that in the OBSS system, the station experiences no extra interference when communicating with the access points, thereby improving stability of data transmission and reducing energy consumption of the system.

In this embodiment, a station allocates sequence numbers to access points within a communication range, so as to avoid communication interference and a time conflict when the access points return messages or data, thereby reducing system power consumption, ensuring normal communication, implementing that when being woken up once in different BSSs, the station can obtain information returned by multiple access points, reducing a quantity of station wake-ups, and reducing energy consumption of the station.

For a typical OBSS system, the following uses a scenario of two access points to describe in detail a data communication method of the present disclosure. When there are three or more access points, a processing method is the same.

Figure 3:
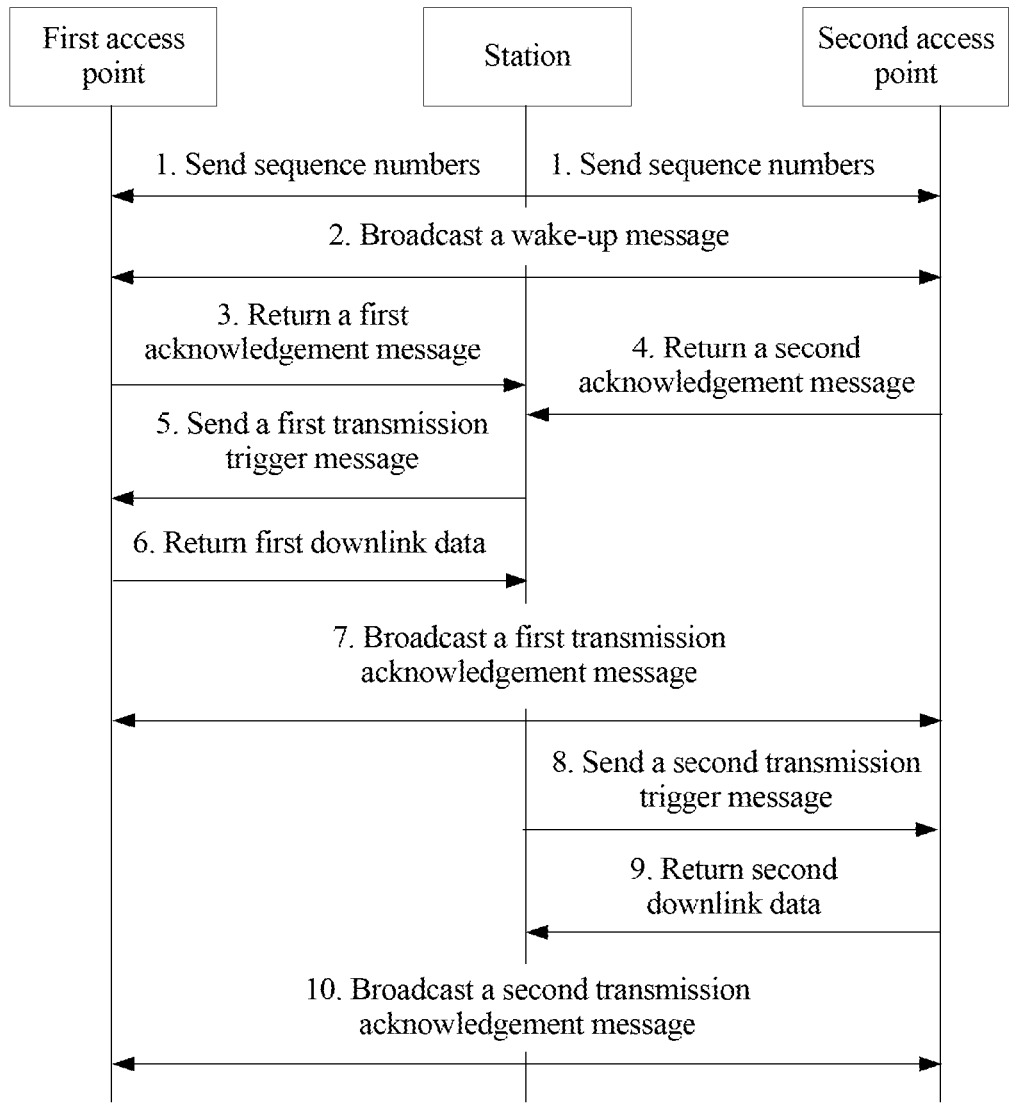
FIG. 3 is a schematic flowchart of a second embodiment of a data communication method according to the present disclosure.

Referring to FIG. 3, FIG. 3 is a schematic flowchart of a second embodiment of a data communication method according to the present disclosure. In this embodiment, the method includes the following steps:

1. A station sends sequence numbers to a first access point and a second access point.

The sequence numbers are configured to indicate a sequence in which the access points respond to the station. In this embodiment, a sequence corresponding to a sequence number of the first access point is higher than a sequence corresponding to a sequence number of the second access point.

2. The station broadcasts a wake-up message to the first access point and the second access point.

The wake-up message is configured to notify the access points within a communication range of the station that the station is in a wake-up state. Optionally, the wake-up message may be a PS-Poll frame or another frame or message configured to implement a wake-up message function. The present disclosure imposes no limitation thereto.

Optionally, the wake-up message may further instruct other stations within the communication range of the station to respectively set network allocation vectors of the other stations, so that the foregoing other stations remain silent within a time specified in an NAV carried in the wake-up message.

3. The first access point returns a first acknowledgement message according to a sequence number.

The first acknowledgement message is configured to indicate whether the first access point needs to transmit downlink data.

Optionally, when receiving the first acknowledgement message, another station within a communication range of the first access point may set an NAV of the another station, and remain silent when the station communicates with the first access point.

4. The second access point returns a second acknowledgement message according to a sequence number.

The second acknowledgement message is configured to indicate whether the second access point needs to transmit downlink data.

It should be noted that the first acknowledgement message and the second acknowledgement message may be ACKs, or may be other fields or messages configured to indicate whether the access points need to transmit downlink data. The present disclosure imposes no limitation thereto.

Optionally, when receiving the second acknowledgement message, another station within a communication range of the second access point may set an NAV of the another station, and remain silent when the station communicates with the second access point. The second access point assumes that the first access point needs to transmit downlink data, and when the first access point does not need to transmit the downlink data, the NAV of the station in the communication range may be reset.

Similarly, when the station subsequently sends a message or data to an access point within the communication range of the station, the station may instruct other stations within the communication range of the station to respectively set network allocation vectors of the other stations; when a corresponding access point within the communication range of the station sends a message or data to the station, another station within a communication range of the access point may also set a network allocation vector of the another station, so as to ensure that communication is not interfered.

In this embodiment, it is assumed that both the first access point and the second access point need to transmit downlink data.

5. The station sends a first transmission trigger message to the first access point according to the sequence numbers.

Optionally, the first transmission trigger message may be a Poll message, or certainly, may be another message that is configured to trigger the access point to return downlink data. The present disclosure imposes no limitation thereto.

6. The first access point returns first downlink data.

Optionally, the first access point may first return an ACK and then send the first downlink data, or may directly send the first downlink data carrying an ACK.

7. The station broadcasts a first transmission acknowledgement message.

Certainly, when the first acknowledgement message of the first access point indicates that no downlink data needs to be transmitted, the station does not need to perform the foregoing steps 5-7, and may directly perform steps 8-10 after performing step 4. When a next wake-up cycle comes, an access point that does not need to transmit downlink data in a previous cycle may need to transmit downlink data; in this case, the station may start a new round of wake-up message broadcasting.

8. The station sends a second transmission trigger message.

9. The second access point returns second downlink data.

Optionally, when the second access point does not receive, within a preset time, the second transmission trigger message sent by the station, the second access point may consider that current transmission is canceled, and an NAV of a station within a working area of the second access point may be reset.

10. The station broadcasts a second transmission acknowledgement message.

According to the foregoing process, it can be implemented that when being woken up once in multiple BSSs, a station obtains information sent by multiple access points.

Figure 4:
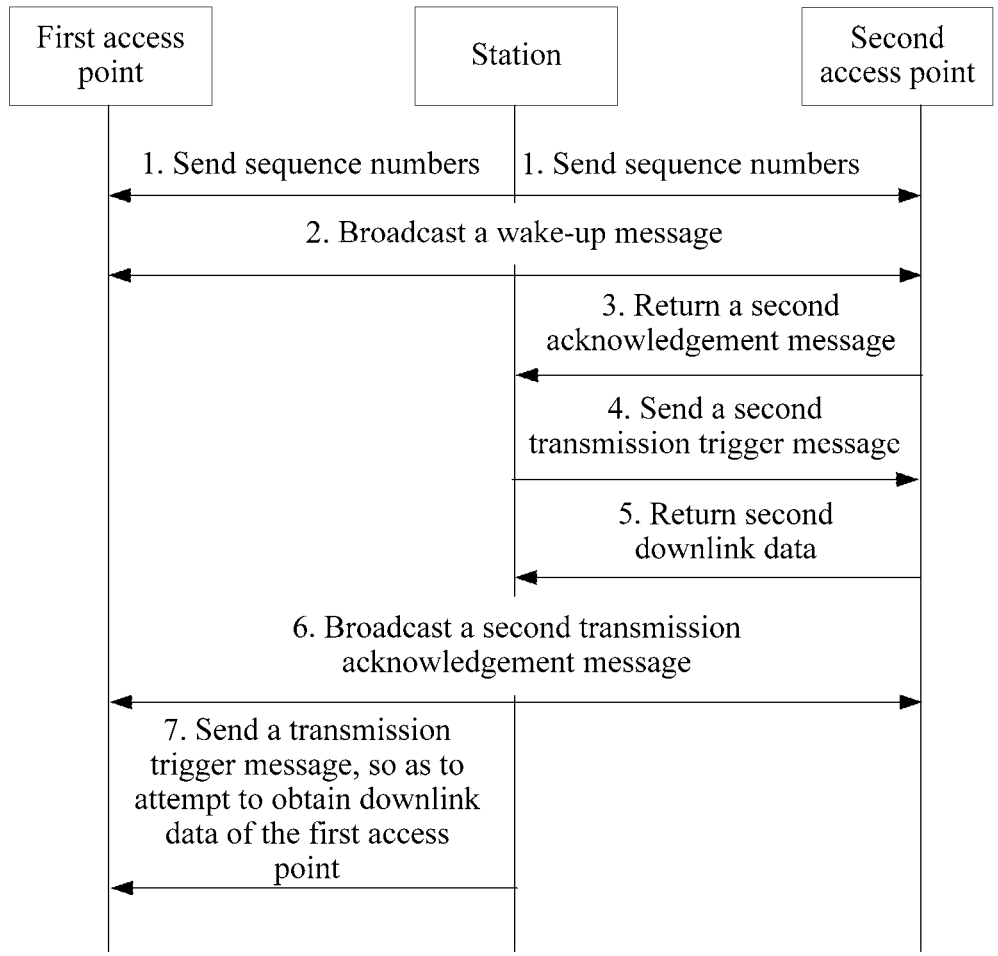
FIG. 4 is a schematic flowchart of a third embodiment of a data communication method according to the present disclosure.

Referring to FIG. 4, FIG. 4 is a schematic flowchart of a third embodiment of a data communication method according to the present disclosure. In this embodiment, a station does not receive, within a preset time, a first acknowledgement message returned by a first access point, and a device of the first access point may be faulty, or communication of the station may become faulty. In this scenario, the method includes the following steps:

1. The station sends sequence numbers to the first access point and a second access point.

2. The station broadcasts a wake-up message to the first access point and the second access point.

3. The second access point returns a second acknowledgement message according to a sequence number.

In this embodiment, it is assumed that the second access point needs to transmit downlink data.

4. The station sends a second transmission trigger message.

5. The second access point returns second downlink data.

6. The station broadcasts a second transmission acknowledgement message.

7. The station sends a transmission trigger message to the first access point, so as to attempt to obtain downlink data of the first access point.

After step 6, when the first access point can normally communicate with the station and need to transmit downlink data at this time, the station may send a transmission trigger message to the first access point. Then, according to a process of the embodiment shown in FIG. 3, the first access point may return the downlink data to the station.

Figure 5:
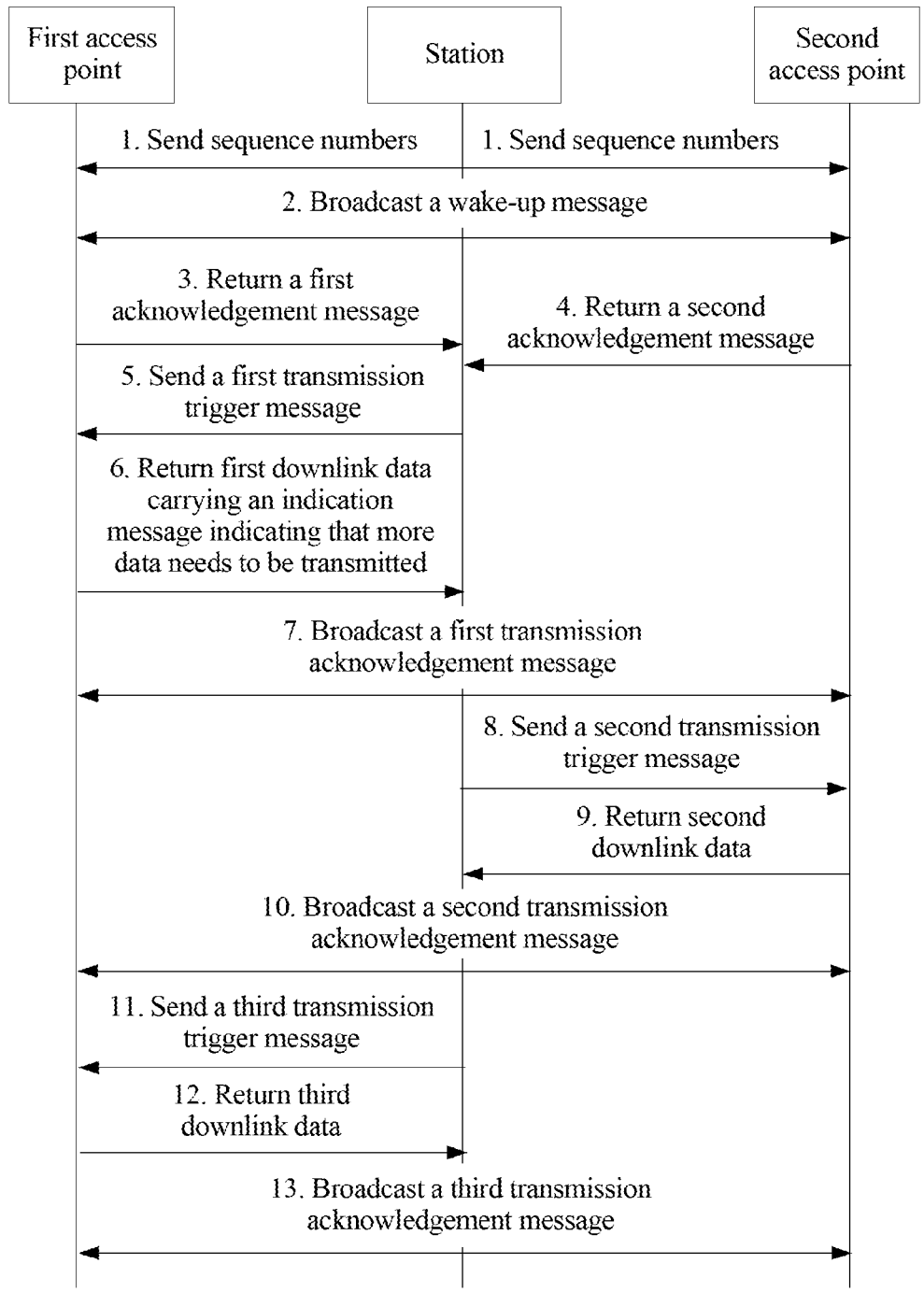
FIG. 5 is a schematic flowchart of a fourth embodiment of a data communication method according to the present disclosure.

Referring to FIG. 5, FIG. 5 is a schematic flowchart of a fourth embodiment of a data communication method according to the present disclosure. In this embodiment, all downlink data of a first access point cannot be transmitted to a station during one transmission. Therefore, more remaining data needs to be transmitted. For example, the method includes the following steps:

1. The station sends sequence numbers to the first access point and a second access point.

2. The station broadcasts a wake-up message to the first access point and the second access point.

3. The first access point returns a first acknowledgement message according to a sequence number.

4. The second access point returns a second acknowledgement message according to a sequence number.

In this embodiment, it is assumed that both the first access point and the second access point need to transmit downlink data.

5. The station sends a first transmission trigger message to the first access point according to the sequence numbers.

6. The first access point returns first downlink data carrying an indication message indicating that more data needs to be transmitted.

Optionally, the indication message may be configured in the first downlink data, or a field or a message may be separately configured to carry the indication message.

7. The station broadcasts a first transmission acknowledgement message.

8. The station sends a second transmission trigger message.

9. The second access point returns second downlink data.

10. The station broadcasts a second transmission acknowledgement message.

11. The station sends a third transmission trigger message to the first access point according to the indication message.

12. The first access point returns third downlink data.

13. The station broadcasts a third transmission acknowledgement message.

Figure 6:
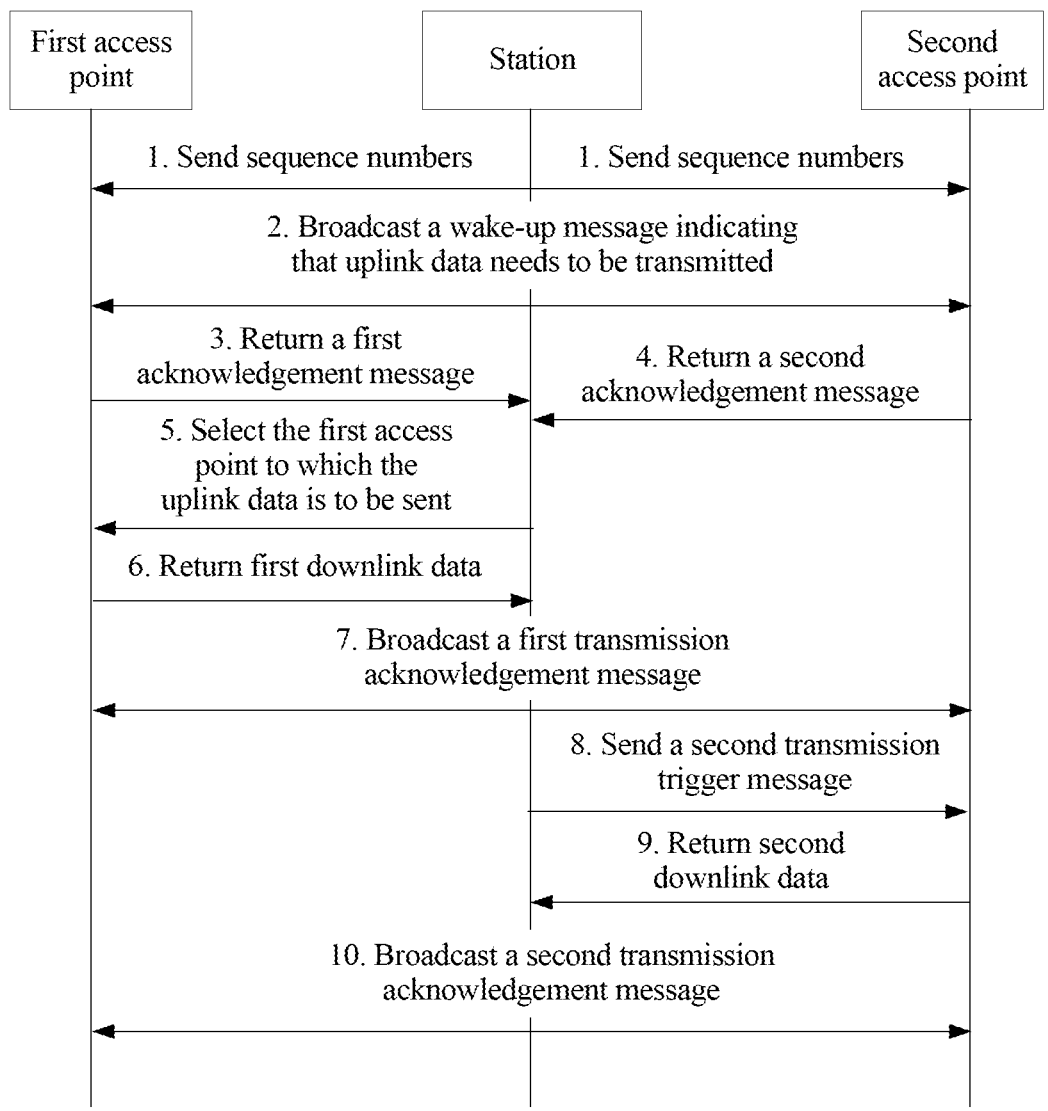
FIG. 6 is a schematic flowchart of a fifth embodiment of a data communication method according to the present disclosure.

Referring to FIG. 6, FIG. 6 is a schematic flowchart of a fifth embodiment of a data communication method according to the present disclosure. In this embodiment, a station has uplink data that needs to be sent. In this case, the station may indicate in a wake-up message that the uplink data needs to be transmitted, and after an access point returns an acknowledgement message, first select one access point to complete uplink data transmission. For example, the method includes the following steps:

1. The station sends sequence numbers to a first access point and a second access point.

2. The station broadcasts the wake-up message to the first access point and the second access point, and the station indicates in the wake-up message that the uplink data needs to be transmitted.

3. The first access point returns a first acknowledgement message according to a sequence number.

4. The second access point returns a second acknowledgement message according to a sequence number.

In this embodiment, it is assumed that both the first access point and the second access point need to transmit downlink data.

5. According to the sequence numbers, the station selects the first access point to which the uplink data is to be sent.

6. The first access point returns first downlink data.

Optionally, the returned first downlink data may carry a message indicating that uplink data transmission is completed.

7. The station broadcasts a first transmission acknowledgement message.

8. The station sends a second transmission trigger message.

9. The second access point returns second downlink data.

10. The station broadcasts a second transmission acknowledgement message.

Figure 7:
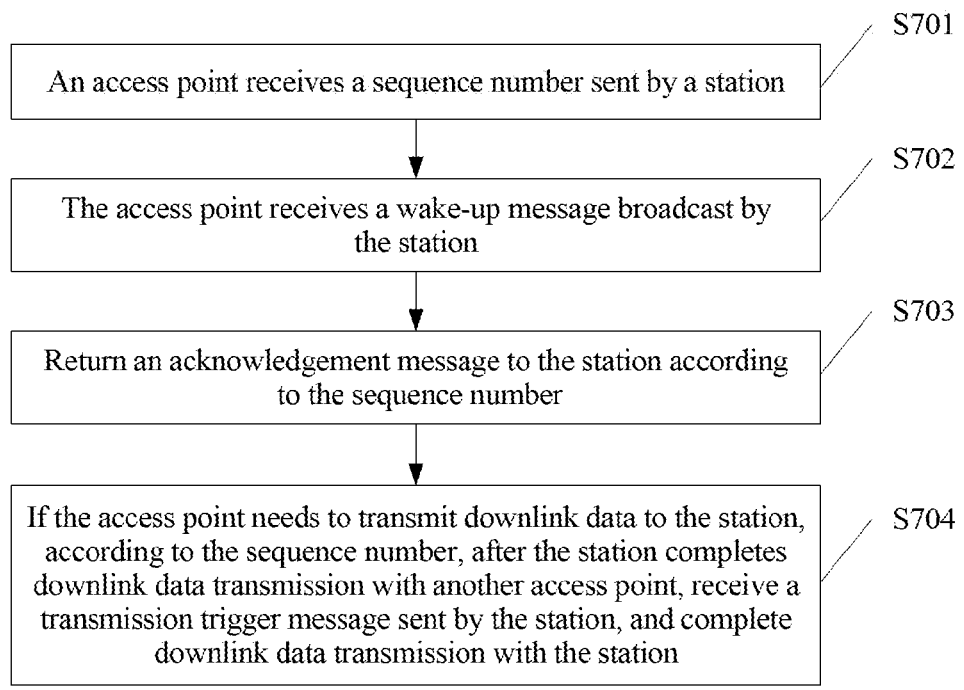
FIG. 7 is a schematic flowchart of a sixth embodiment of a data communication method according to the present disclosure.

Referring to FIG. 7, FIG. 7 is a schematic flowchart of a sixth embodiment of a data communication method according to the present disclosure. In this embodiment, the method includes the following steps:

S701. An access point receives a sequence number sent by a station.

The sequence number is configured to indicate a sequence in which the access point responds to the station.

S702. The access point receives a wake-up message broadcast by the station.

The wake-up message is configured to notify the access point that the station is in a wake-up state.

S703. Return an acknowledgement message to the station according to the sequence number.

The acknowledgement message is configured to indicate whether the access point needs to transmit downlink data.

S704. When the access point needs to transmit the downlink data to the station, according to the sequence number, after the station completes downlink data transmission with another access point, receive a transmission trigger message sent by the station, and complete downlink data transmission with the station.

A sequence corresponding to a sequence number of the another access point is higher than the sequence corresponding to the sequence number of the access point.

Optionally, the receiving a transmission trigger message sent by the station, and completing downlink data transmission with the station includes:

receiving, by the access point, the transmission trigger message sent by the station; and sending the downlink data to the station, so that the station broadcasts a transmission acknowledgement message.

After the access point receives the transmission trigger message sent by the station and sends the downlink data to the station, when the access point still has remaining data that needs to be transmitted to the station, when sending the downlink data to the station, the access point sends, to the station, an indication message indicating that more data needs to be transmitted;

after an access point of a lowest sequence corresponding to a sequence number completes downlink data transmission with the station, the access point receives a transmission trigger message sent by the station; and the access point sends, to the station, the remaining data that needs to be transmitted.

Figure 8:
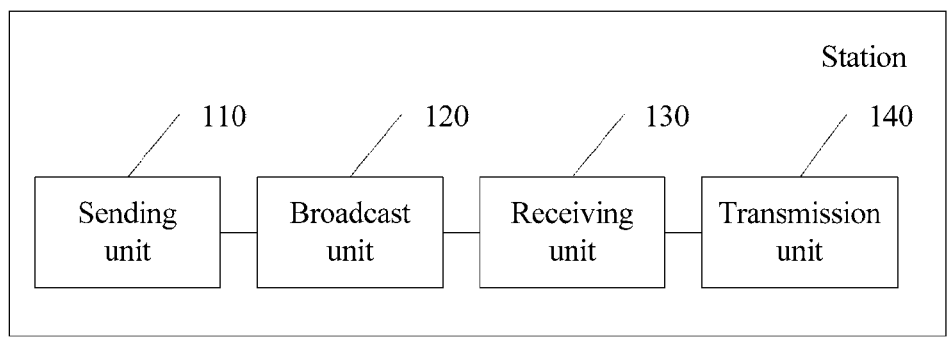
FIG. 8 is a schematic composition diagram of a first embodiment of a station according to the present disclosure.

Referring to FIG. 8, FIG. 8 is a schematic composition diagram of a first embodiment of a station according to the present disclosure. In this embodiment, the station includes:

a sending unit 110, configured to send sequence numbers to at least two access points, where the sequence numbers are configured to indicate a sequence in which the access points respond to the station;

a broadcast unit 120, configured to broadcast a wake-up message to the at least two access points, where the wake-up message is configured to notify the at least two access points that the station is in a wake-up state;

a receiving unit 130, configured to receive acknowledgement messages sequentially returned by the at least two access points according to the sequence numbers of the access points, where the acknowledgement messages are configured to indicate whether the access points need to transmit downlink data; and a transmission unit 140, configured to determine, according to the sequentially returned acknowledgement messages, whether the corresponding access points need to transmit the downlink data; and sequentially complete, according to the sequence numbers, downlink data transmission with the access points that need to transmit the downlink data.

When the at least two access points include a first access point and a second access point, and a sequence corresponding to a sequence number of the first access point is higher than a sequence corresponding to a sequence number of the second access point, the sending unit 110 is further configured to send a first transmission trigger message to the first access point, so that the first access point returns first downlink data;

the broadcast unit 120 is further configured to broadcast a first transmission acknowledgement message;

the sending unit 110 is further configured to send a second transmission trigger message to the second access point after the broadcast unit 120 broadcasts the first transmission acknowledgement message, so that the second access point returns second downlink data; and the broadcast unit 120 is further configured to broadcast a second transmission acknowledgement message.

When the first access point further needs to transmit third downlink data to the station after transmitting the first downlink data, when the first access point returns the first downlink data, the receiving unit 130 is further configured to receive an indication message that is sent by the first access point and indicates that more data needs to be transmitted; and after the broadcast unit 120 broadcasts the second transmission acknowledgement message, the sending unit 110 is further configured to send a third transmission trigger message to the first access point, so that the first access point returns the third downlink data.

The wake-up message is further configured to indicate whether the station needs to transmit uplink data; and when the station needs to transmit the uplink data, after the receiving unit 130 receives the acknowledgement messages sequentially returned by the at least two access points according to the sequence numbers of the access points, the station instructs the transmission unit 140 to select an access point of a highest sequence corresponding to a sequence number from the at least two access points to complete uplink data transmission.

After the transmission unit 140 sequentially completes, according to the sequence numbers, downlink data transmission with the access points that need to transmit the downlink data, the sending unit 110 is further configured to send a transmission trigger message to an access point that does not return an acknowledgement message within a preset time, so as to attempt to obtain downlink data of the access point that does not return the acknowledgement message within the preset time.

It should be noted that, the foregoing sending unit, broadcast unit, receiving unit, and transmission unit may independently exist, or may be disposed in an integrated manner. The sending unit, the broadcast unit, the receiving unit, or the transmission unit in the foregoing station embodiment may be independently disposed in a form of hardware that is independent of a processor of the station, and may be disposed in a microprocessor form; or may be built in the processor of the station in a hardware form, or may be stored in a memory of the station in a software form, so that the processor of the station invokes and executes an operation corresponding to the foregoing sending unit, broadcast unit, receiving unit, or transmission unit.

For example, in the first embodiment (the embodiment shown in FIG. 8) of the station according to the present disclosure, the transmission unit 140 may be the processor of the station, and functions of the sending unit 110, the broadcast unit 120, and the receiving unit 130 may be embedded into the processor, or may be independently configured independent of the processor, or may be stored in the memory in the software form, where the functions are invoked and implemented by the processor. Certainly, the sending unit 110 and the receiving unit 130 may be disposed in the integrated manner, or may be independently disposed, or may be used as an interface circuit of the station, which is independently disposed or disposed in the integrated manner. This embodiment of the present disclosure imposes no limitation thereto. The foregoing processor may be a central processing unit (CPU), a microprocessor, a single-chip microcomputer, or the like.

Figure 9:
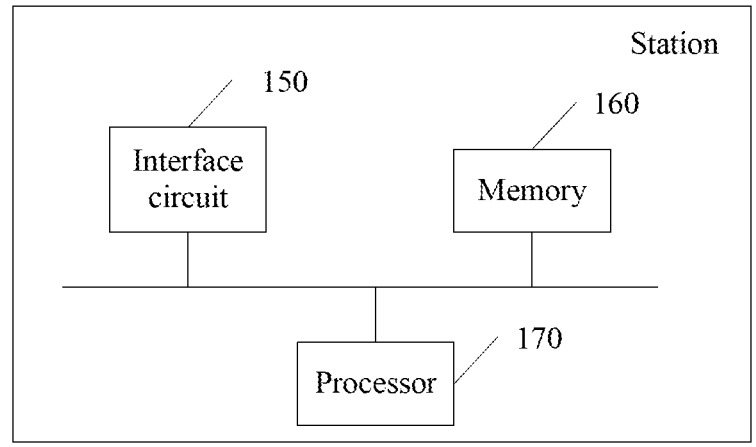
FIG. 9 is a schematic composition diagram of a second embodiment of a station according to the present disclosure.

Referring to FIG. 9, FIG. 9 is a schematic composition diagram of a second embodiment of a station according to the present disclosure. In this embodiment, the station includes: an interface circuit 150, a memory 160, and a processor 170 connected to the interface circuit 150 and the memory 160. The memory 160 is configured to store a set of program code, and the processor 170 is configured to invoke the program code stored in the memory 160, so as to execute the operations in any one of the first to the fifth embodiments of the data communication method according to the present disclosure.

Figure 10:
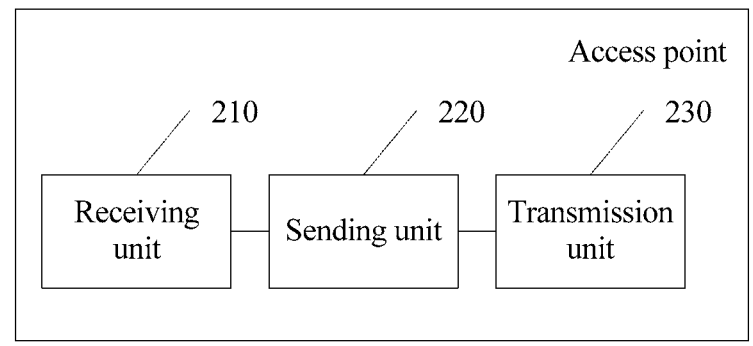
FIG. 10 is a schematic composition diagram of a first embodiment of an access point according to the present disclosure.

Referring to FIG. 10, FIG. 10 is a schematic composition diagram of a first embodiment of an access point according to the present disclosure. In this embodiment, the access point includes:

a receiving unit 210, configured to receive a sequence number sent by a station, where the sequence number is configured to indicate a sequence in which the access point responds to the station; and receive a wake-up message broadcast by the station, where the wake-up message is configured to notify the access point that the station is in a wake-up state;

a sending unit 220, configured to return an acknowledgement message to the station according to the sequence number, where the acknowledgement message is configured to indicate whether the access point needs to transmit downlink data; and a transmission unit 230, configured to: when the access point needs to transmit the downlink data to the station, according to the sequence number, after the station completes downlink data transmission with another access point, receive a transmission trigger message sent by the station, and complete downlink data transmission with the station, where a sequence corresponding to a sequence number of the another access point is higher than the sequence corresponding to the sequence number of the access point.

The transmission unit 230 may be configured to:

receive the transmission trigger message sent by the station; and send the downlink data to the station, so that the station broadcasts a transmission acknowledgement message.

After the transmission unit 230 receives the transmission trigger message sent by the station and sends the downlink data to the station, when the access point still has remaining data that needs to be transmitted to the station, when the transmission unit 230 sends the downlink data to the station, the transmission unit 230 is further configured to send, to the station, an indication message indicating that more data needs to be transmitted; and after an access point of a lowest sequence corresponding to a sequence number completes downlink data transmission with the station, the transmission unit 230 is further configured to receive a transmission trigger message sent by the station, and send, to the station, the remaining data that needs to be transmitted.

Figure 11:
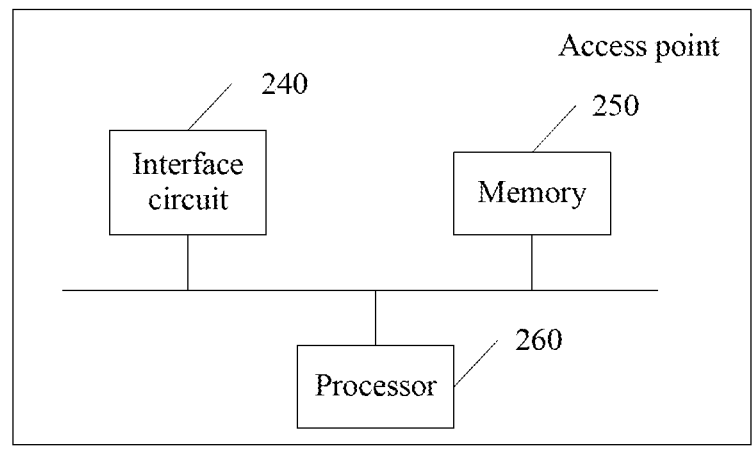
FIG. 11 is a schematic composition diagram of a second embodiment of an access point according to the present disclosure.

Referring to FIG. 11, FIG. 11 is a schematic composition diagram of a second embodiment of an access point according to the present disclosure. In this embodiment, the access point includes: an interface circuit 240, a memory 250, and a processor 260 connected to the interface circuit 240 and the memory 250. The memory 250 is configured to store a set of program code, and the processor 260 is configured to invoke the program code stored in the memory 250, so as to execute the operations in the sixth embodiment of the data communication method according to the present disclosure.

Figure 12:
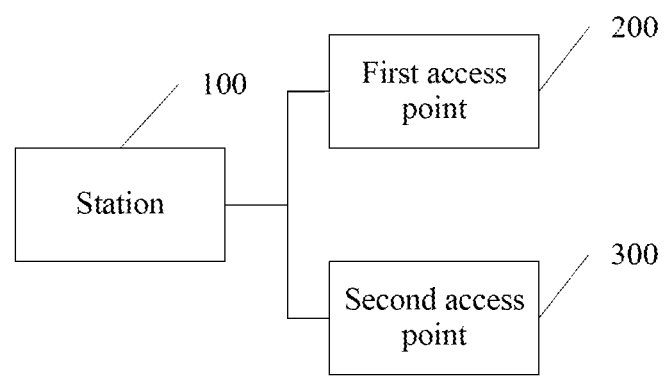
FIG. 12 is a schematic composition diagram of a system according to an embodiment of the present disclosure.

Referring to FIG. 12, FIG. 12 is a schematic composition diagram of a system according to an embodiment of the present disclosure. In this embodiment, the system includes:

the station 100 described in either the first or the second embodiment of the station according to the present disclosure;

a first access point 200, configured to receive a sequence number allocated by the station 100; when receiving a wake-up message of the station 100, return a first acknowledgement message according to the sequence number allocated by the station 100; and when needing to transmit downlink data, complete downlink data transmission with the station 100 according to the sequence number; and a second access point 300, configured to receive a sequence number allocated by the station 100, where a sequence corresponding to the sequence number of the first access point 200 is higher than a sequence corresponding to the sequence number of the second access point 300; when receiving the wake-up message of the station 100, return a second acknowledgement message according to the sequence number allocated by the station 100; and after the station 100 completes downlink data transmission with the first access point 200, the second access point 300 completes downlink data transmission with the stations 100 according to the sequence number.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly; for related parts, reference may be made to partial descriptions in the method embodiment.

According to the description of the foregoing embodiments, the present disclosure has the following advantages:

A station allocates sequence numbers to access points within a communication range, so as to avoid communication interference and a time conflict when the access points return messages or data, thereby reducing system power consumption, ensuring normal communication, implementing that when being woken up once in different BSSs, the station can obtain information returned by multiple access points, reducing a quantity of station wake-ups, and reducing energy consumption of the station.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing describes in detail a data communication method, a station, an access point, and a system that are provided in the embodiments of the present disclosure. In this specification, specific examples are configured to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A data communication method, comprising:
sending, by a station, sequence numbers to at least two access points, wherein the sequence numbers indicate a sequence in which the access points respond to the station;
broadcasting, by the station, a wake-up message to the at least two access points, wherein the wake-up message notifies the at least two access points that the station is in a wake-up state;
receiving acknowledgement messages sequentially returned by the at least two access points according to the sequence numbers of the access points, wherein the acknowledgement messages indicate whether the access points need to transmit downlink data;
determining, according to the sequentially returned acknowledgement messages, whether the corresponding access points need to transmit the downlink data; and
sequentially completing, by the station according to the sequence numbers, downlink data transmission with the access points that need to transmit the downlink data.

2. The method according to claim 1, wherein when the at least two access points comprise a first access point and a second access point, and a sequence corresponding to a sequence number of the first access point is higher than a sequence corresponding to a sequence number of the second access point, the sequentially completing, by the station according to the sequence numbers, downlink data transmission with the access points that need to transmit the downlink data comprises:
sending, by the station, a first transmission trigger message to the first access point, so that the first access point returns first downlink data;
broadcasting, by the station, a first transmission acknowledgement message;
sending, by the station, a second transmission trigger message to the second access point, so that the second access point returns second downlink data; and
broadcasting, by the station, a second transmission acknowledgement message.

3. The method according to claim 2, wherein when the first access point further needs to transmit third downlink data to the station after transmitting the first downlink data, when the first access point returns the first downlink data, the station receives an indication message that is sent by the first access point and indicates that more data needs to be transmitted; and after the station broadcasts the second transmission acknowledgement message, the station sends a third transmission trigger message to the first access point, so that the first access point returns the third downlink data.

4. A station comprising one or more processors, which alone or in combination are configured to facilitate performing:
sending sequence numbers to at least two access points, wherein the sequence numbers indicate a sequence in which the access points respond to the station;
broadcasting a wake-up message to the at least two access points, wherein the wake-up message notifies the at least two access points that the station is in a wake-up state;
receiving acknowledgement messages sequentially returned by the at least two access points according to the sequence numbers of the access points, wherein the acknowledgement messages indicate whether the access points need to transmit downlink data; and
determining, according to the sequentially returned acknowledgement messages, whether the corresponding access points need to transmit the downlink data; and
sequentially completing, according to the sequence numbers, downlink data transmission with the access points that need to transmit the downlink data.

5. The station according to claim 4, wherein when the at least two access points comprise a first access point and a second access point, and a sequence corresponding to a sequence number of the first access point is higher than a sequence corresponding to a sequence number of the second access point, further configured to perform:
sending a first transmission trigger message to the first access point, so that the first access point returns first downlink data;
broadcasting a first transmission acknowledgement message;
sending a second transmission trigger message to the second access point after the broadcast unit broadcasts the first transmission acknowledgement message, so that the second access point returns second downlink data; and
broadcasting a second transmission acknowledgement message.

6. The station according to claim 5, wherein when the first access point further needs to transmit third downlink data to the station after transmitting the first downlink data, when the first access point returns the first downlink data, the station receives an indication message that is sent by the first access point and indicates that more data needs to be transmitted; and after broadcasting the second transmission acknowledgement message, sending a third transmission trigger message to the first access point, so that the first access point returns the third downlink data.

7. A system, comprising:
a station configured to send sequence numbers to at least two access points, wherein the sequence numbers indicate a sequence in which the access points respond to the station; and broadcast a wake-up message to the at least two access points, wherein the wake-up message notifies the at least two access points that the station is in a wake-up state; and receive acknowledgement messages sequentially returned by the at least two access points according to the sequence numbers of the access points, wherein the acknowledgement messages indicate whether the access points need to transmit downlink data; and determine, according to the sequentially returned acknowledgement messages, whether the corresponding access points need to transmit the downlink data; and sequentially complete, according to the sequence numbers, downlink data transmission with the access points that need to transmit the downlink data;
a first access point, configured to receive a sequence number allocated by the station; when receiving a wake-up message of the station, return a first acknowledgement message according to the sequence number allocated by the station; and when needing to transmit downlink data, complete downlink data transmission with the station according to the sequence number; and
a second access point, configured to receive a sequence number allocated by the station, wherein a sequence corresponding to the sequence number of the first access point is higher than a sequence corresponding to the sequence number of the second access point; when receiving the wake-up message of the station, return a second acknowledgement message according to the sequence number allocated by the station; and after the station completes downlink data transmission with the first access point, the second access point completes downlink data transmission with the station according to the sequence number.

* * * * *